(12) United States Patent
Azuma et al.

(10) Patent No.: US 6,266,102 B1
(45) Date of Patent: *Jul. 24, 2001

(54) IMAGE DISPLAY METHOD, GRADATION CONVERSION CIRCUIT, AND IMAGE SIGNAL CONVERSION APPARATUS

(75) Inventors: Takeo Azuma; Atsushi Morimura, both of Nara (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/723,877

(22) Filed: Sep. 23, 1996

(30) Foreign Application Priority Data

Sep. 25, 1995 (JP) .................................................. 7-245714
Nov. 27, 1995 (JP) .................................................. 7-307058

(51) Int. Cl.[7] ...................................................... H04N 5/14
(52) U.S. Cl. ......................... 348/671; 348/672; 348/625; 348/252; 382/266
(58) Field of Search ..................... 348/625, 627, 348/630, 671–675, 684, 252; 382/266, 268–269, 271–274, 22, 199; 358/515–522

(56) References Cited

U.S. PATENT DOCUMENTS

| | | | |
|---|---|---|---|
| 4,158,838 | * 6/1979 | Pruznick et al. | 345/507 |
| 4,220,972 | * 9/1980 | Geokezas et al. | 348/573 |
| 4,228,465 | * 10/1980 | Stone et al. | 348/619 |
| 4,353,092 | * 10/1982 | Bailey et al. | 348/672 |
| 4,745,465 | * 5/1988 | Kwon | 358/522 |
| 5,058,181 | * 10/1991 | Ishihara et al. | 382/266 |
| 5,063,604 | 11/1991 | Weiman | 382/41 |
| 5,079,698 | 1/1992 | Grenier et al. | 364/413.13 |
| 5,093,871 | * 3/1992 | Klein et al. | 382/172 |
| 5,101,440 | * 3/1992 | Watanabe et al. | 382/22 |
| 5,113,484 | 5/1992 | Jeong | 395/24 |
| 5,128,864 | 7/1992 | Waggener | 364/413.21 |
| 5,140,423 | 8/1992 | Lee | 358/162 |
| 5,150,214 | 9/1992 | Shin et al. | 358/166 |
| 5,224,177 | * 6/1993 | Doi et al. | 382/168 |
| 5,239,378 | * 8/1993 | Tsuji et al. | 358/166 |
| 5,258,580 | 11/1993 | Bergholt | 177/25.18 |
| 5,262,978 | 11/1993 | Ito | 364/825 |
| 5,268,860 | 12/1993 | Ito | 364/825 |
| 5,268,967 | * 12/1993 | Jang et al. | 382/132 |
| 5,271,064 | * 12/1993 | Dhawan et al. | 382/266 |
| 5,294,984 | * 3/1994 | Mori et al. | 348/625 |
| 5,296,090 | * 3/1994 | Solares et al. | 216/87 |
| 5,442,462 | * 8/1995 | Guissin | 358/463 |
| 5,463,697 | * 10/1995 | Toda et al. | 382/199 |
| 5,528,703 | * 6/1996 | Lee | 382/257 |
| 5,631,984 | * 5/1997 | Graf et al. | 382/317 |
| 5,681,112 | * 10/1997 | Kuroda et al. | 382/274 |
| 5,760,843 | * 6/1998 | Morimura et al. | 348/678 |
| 5,805,216 | * 9/1998 | Tabei et al. | 348/246 |
| 5,835,161 | * 11/1998 | Keller | 348/671 |

FOREIGN PATENT DOCUMENTS

06217234 * 8/1994 (JP) .

OTHER PUBLICATIONS

Patent Abstracts of Japan, Publication No. 07170428A Method and Device for Displaying Picture, published Jul. 4, 1995.

* cited by examiner

*Primary Examiner*—Reinhard J. Eisenzopf
*Assistant Examiner*—Linus H. Lo
(74) *Attorney, Agent, or Firm*—Smith, Gambrell & Russell, LLP

(57) ABSTRACT

An image display method displays an image by different gradation conversion in every pixel, on the basis of gradation frequency distribution of luminance of pixels near an edge of the image, and counting of gradation frequency of luminance of pixels near the edge is weighted depending on the coordinate values of each pixel so as to eliminate relative contrast drop in the image central part from the image peripheral parts.

28 Claims, 18 Drawing Sheets

Calculating region of local histogram

Field image

Fig. 4 Input and output characteristic of characteristic conversion circuit

Calculating region of local histogram

Field image

Distribution of weighting coefficients

IMAGE DISPLAY METHOD, GRADATION CONVERSION CIRCUIT, AND IMAGE SIGNAL CONVERSION APPARATUS

BACKGROUND OF THE INVENTION

1. Field of the Invention

The present invention relates to an image display method and its apparatus capable of obtaining an image of high picture quality on a display screen of, for example, television signal.

2. Related Art of the Invention

The television screen size is becoming larger recently, and the projection type system using a liquid crystal panel is highly expected for a large screen over 40 inches.

At the same time, broadcasting of high definition television has begun, and there is a mounting need for a display device of high resolution and wide area.

Further, by three-CCD camera and others, image pickup of high dynamic range is realized.

However, the display device of high resolution and wide area is not sufficient in the contrast performance, and the image of high dynamic range cannot be expressed sufficiently by a conventional display device.

As its improving method, a technique as disclosed in Japanese Laid-open Patent 7-170428 (Japanese Patent Application 6-3457) has been proposed.

This conventional contrast improving method is described below.

FIG. 13 is a block diagram of its entire apparatus, in which reference numeral 101 is a gradation conversion circuit for converting the gradation of input luminance, and 102 is an illusion waveform generating circuit for generating a waveform for causing an illusion from the input luminance, and this apparatus is designed to obtain an image improved in contrast by superposing an illusion waveform on the luminance converted in gradation by the gradation conversion circuit 101.

The detail of the gradation conversion circuit 101 and illusion waveform generating circuit 102 is described below. FIG. 14 is a block diagram of the gradation conversion circuit 101. A frame memory 123 stores the luminance input for the portion of one frame. An edge extraction circuit 124 extracts an edge from the luminance input. A gradation conversion table calculating circuit 125 divides one frame into 9 regions shown in FIG. 15, and calculates the gradation conversion tables in nine representative points q1 to q9 of nine regions according to a predetermined rule, by making use of the luminance of the pixels of the edge neighbor regions in each divided region, and writes them into a memory table 126.

A gradation conversion table interpolation circuit 129 reads coordinate values of an arbitrary element of notice to be converted in gradation, from a read control circuit 127, interpolates the gradation conversion tables in the representative points q1 to q9 corresponding to the coordinate values (for example, linear interpolation for weighting and adding the gradation conversion tables at four neighbor points, by the distance between the four points and element of notice), and writes into a table memory 128.

On the other hand, the read control circuit 127 reads out the luminance data of pixels in the sequence of scanning from the frame memory 123, and issues the read coordinate values of the pixel into the gradation conversion table interpolation circuit 129, and reads out the converted value of the luminance of the pixel from a table memory 128, and issues as a converted luminance.

Next, the illusion waveform generating circuit 102 is described. FIG. 16 shows a step input into the illusion waveform generating circuit 102, and FIG. 17 shows a step response of the illusion waveform generating circuit 102.

In FIG. 16 and FIG. 17, for the sake of simplicity, the luminance distribution is expressed one-dimensionally. The step response of the illusion waveform generating circuit 102 attenuates the low frequency components of the step input, and converts the output characteristic (gain characteristic) into a luminance amplitude range not causing feel of strangeness at the time of observation.

FIG. 18 shows a luminance distribution sensed at the time of observation, by superposing the step response of illusion waveform generating circuit 102 on the step input of the original input. In FIG. 18, a solid line shows the luminance level of the step response of the illusion waveform generating circuit 102 superposed on the step input, and a broken line refers to the luminance distribution sensed at the time of observation. As understood from this broken line, FIG. 18 shows that the psychological contrast is improved by superposing the output of the illusion waveform generating circuit 102.

Furthermore, concerning the luminance distribution as indicated by solid line in FIG. 19, a luminance difference of I1–I0 is sensed at position x1 as indicated by a broken line, while a luminance difference of I2–I1 is sensed at position x2, and between positions x1 and x2, a luminance difference of I1 and I2 is not sensed, so that the luminance differences I1–I0, I3–I2 greater in sum than the luminance range of I3–I0 can be displayed in the luminance range of. I3–I0, thereby improving the contrast.

Thus, hitherto, by utilizing both local gradation conversion on the basis of the luminance distribution near the edge and the superposition of the illusion waveform, the gradation reproduction capability of the display device is enhanced, and the contrast sensed at the time of observation of image is improved.

Such conventional constitution, however, had the following problems.

1) The boundary of the no-picture area around the image (corresponding to the horizontal and vertical blank period) is extracted as an edge, and the luminance frequency distribution near the boundary (that is, the luminance frequency distribution in the peripheral part of image) has a large affect on the result of processing, and the contrast in the middle of the image is relatively lowered as compared with the peripheral part.

2) When the entire image is divided into nine local regions, the region initially uniform in luminance in the entire screen may be converted bright in the image peripheral part and dark in the central part, or, to the contrary, dark in the peripheral part and bright in the central part, and hence strangeness may be felt when observing.

3) The circuit scale is larger as compared with other conventional techniques (histogram equalization).

4) The circuit scale is too large depending on the manner of generating illusion waveform in the prior art.

SUMMARY OF THE INVENTION

In the light of the above problems, it is an object of the invention to present an image display method for displaying an image of high dynamic range improved in contrast, without having effects of non-picture boundary in the peripheral part of image, without causing relative contrast drop in the image central parts, and in a small circuit scale and calculation cost.

An image display method of the present invention for displaying an image by different gradation conversion in every pixel, on the basis of gradation frequency distribution of luminance of pixels near edge of the image, is characterized in that counting of gradation frequency of luminance of pixels near the edge is weighted depending on the coordinate values of each pixel so as to eliminate relative contrast drop in the image central part from the image peripheral parts.

An image display method of the present invention for displaying an image by different gradation conversion in every pixel, on the basis of gradation frequency distribution of luminance of pixels near edge of the image,
is characterized in that wherein counting of gradation frequency of luminance of pixels near the edge is weighted depending on the gradation, so as to perform γ-correction process depending on the characteristic of the display device together with gradation conversion.

An image display method of the present invention for displaying an image by different gradation conversion in every pixel, by obtaining a gradation conversion table, on the basis of gradation frequency distribution of luminance of pixels near edge of the image, and utilizing the obtained gradation conversion table,
is characterized in that counting of gradation frequency of luminance of pixels near the edge is not done in the periphery of the image, so as not to cause feeling of strangeness in the image central part at the time of observation due to effects of frequency of luminance of pixel near the edge of the image peripheral parts on the gradation conversion table.

An image display method of the present invention for displaying an image by different gradation conversion in every pixel, by obtaining a gradation conversion table, on the basis of gradation frequency distribution of luminance of pixels near edge of the image, and utilizing the obtained gradation conversion table,
is characterized in that feeling of strangeness at the time of observation due to change of brightness of the object in the image in the time direction is decreased by limiting the change of the gradation conversion table in the time direction.

An image display method of the present invention for displaying an image by different gradation conversion in every pixel, by obtaining a gradation conversion table, on the basis of gradation frequency distribution of luminance of pixels near edge of the image, and utilizing the obtained gradation conversion table,
is characterized in that the gradation conversion tables in a specific number of representative regions in the image are calculated on the basis of the luminance distribution of pixels near the edge, and the gradation conversion is executed by interpolating or extrapolating the conversion result by the gradation conversion table in the representative regions for each pixel.

An image display method of the present invention of generating an image for causing an illusion from an input image, and superposing it on an image converted in gradation from an input image, thereby improving the contrast sensed at the time of observation,
is characterized in that the calculation cost is reduced and the illusion effect is obtained by using an IIR filter in the vertical direction at the time of generation of an image for causing an illusion.

An image display method of the present invention of generating an image for causing an illusion from an input image, and superposing it on an image converted in gradation from an input image, thereby improving the contrast sensed at the time of observation,
is characterized in that the contrast is improved depending on the characteristic of the display device by
(a) performing γ-correction on the luminance after superposing the illusion image depending on the characteristic of the display device, or
(b) performing γ-correction on the gradation converted signal, or
(c) correcting the value of gradation conversion table used in gradation conversion depending on the characteristic of the display device, or
(d) performing γ-correction preliminarily on the luminance value of pixel of the input image.

A gradation conversion circuit comprising an edge extraction circuit for receiving an image signal and extracting an edge, a gradation conversion table calculating circuit for obtaining a gradation conversion table on the basis of the gradation frequency distribution of luminance of pixels near the extracted edge, a memory for storing the calculated gradation conversion table, and a conversion circuit for performing different gradation conversion of the image signal in every pixel by making use of the stored gradation conversion table,
is characterized in that the gradation conversion table calculating circuit is characterized by not performing counting of gradation frequency of pixels near the edge in the peripheral parts of the image, so as not to cause feeling of strangeness in the image central part at the time of observation due to effects of frequency of luminance of pixels near the edge in the image peripheral parts on the gradation conversion table.

PREFERRED EMBODIMENTS
(Embodiment 1)

Figure 1:
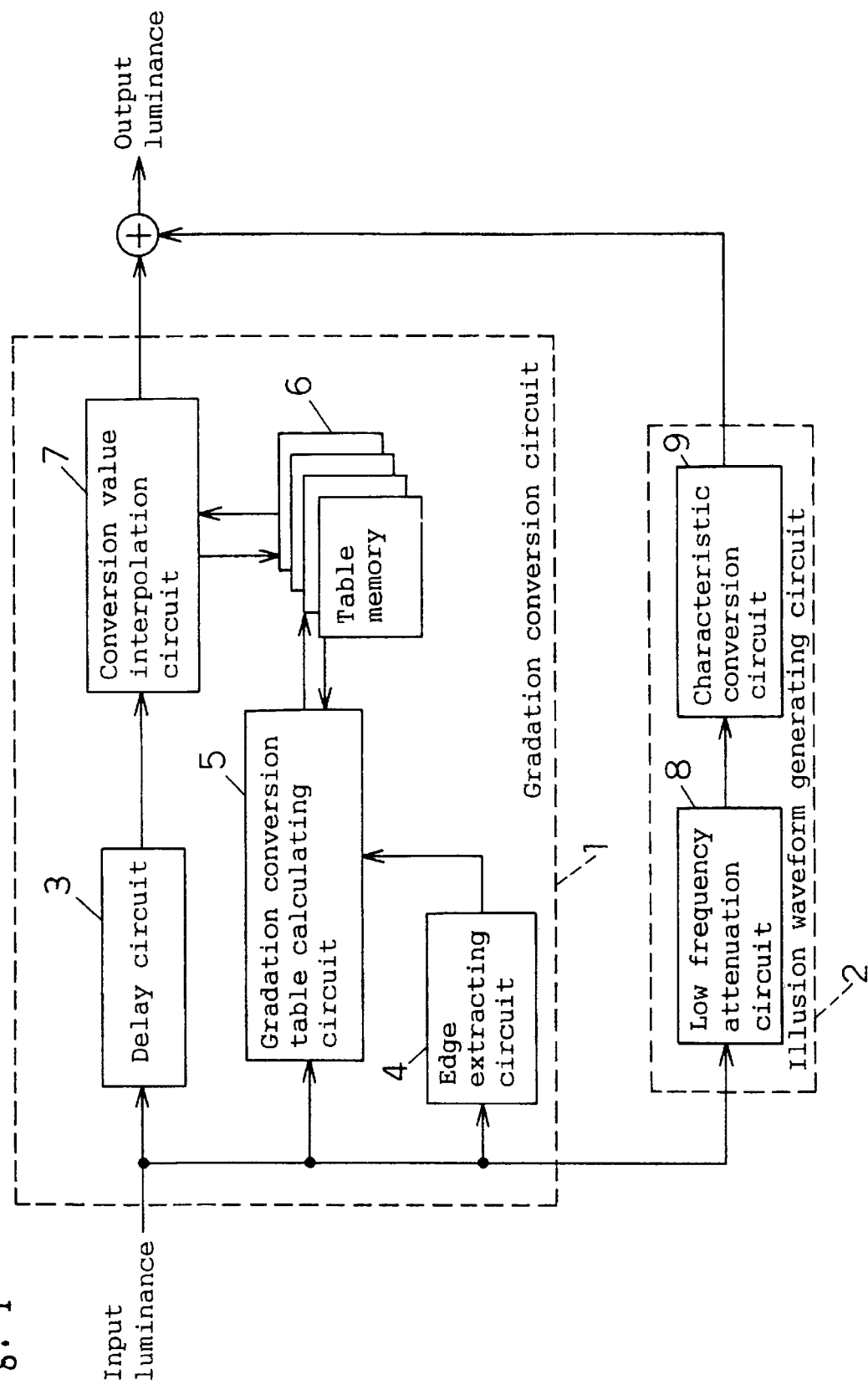
FIG. 1 is a block diagram of an image display apparatus in a first embodiment of the invention.

FIG. 1 is a block diagram of an image display apparatus in a first embodiment of the invention.

In FIG. 1, reference numeral 1 is a gradation conversion circuit for converting the luminance level depending on the luminance frequency of local pixels near the edge and coordinate values of pixels, and 2 is an illusion waveform generating circuit for generating a waveform for causing an illusion of luminance level. In the gradation conversion circuit 1, reference numeral 3 is a delay circuit for issuing a luminance of input image after a delay time corresponding to the portion of delay time by the illusion waveform generating circuit 2, 4 is an edge extraction circuit for extracting the edge of luminance of input image, 5 is a gradation conversion table calculating circuit for calculating the gradation conversion table depending on the local pixel luminance frequency (quantity) near the edge, 6 is a table memory for storing the gradation conversion table of each representative region set in the image, 7 is a conversion value interpolating circuit for calculating interpolation, on the basis of the result of converting the luminance of pixel of notice by each gradation conversion table, depending on the coordinate values of the pixel of notice, 8 is a low frequency attenuation circuit for attenuating the low spatial frequency component of input luminance, and 9 is a characteristic conversion circuit for issuing an illusion waveform by converting the amplitude characteristic of the output of the low frequency attenuation circuit 8.

In the above constitution, the operation is described below. The delay circuit 3 holds the pixel luminance of the input image for a specific time, and issues it after a delay time depending on the portion of delay time by the illusion waveform generating circuit 2. The edge extraction circuit 4 extracts and issues high frequency components of the spatial frequency of luminance of input image.

Figure 2:
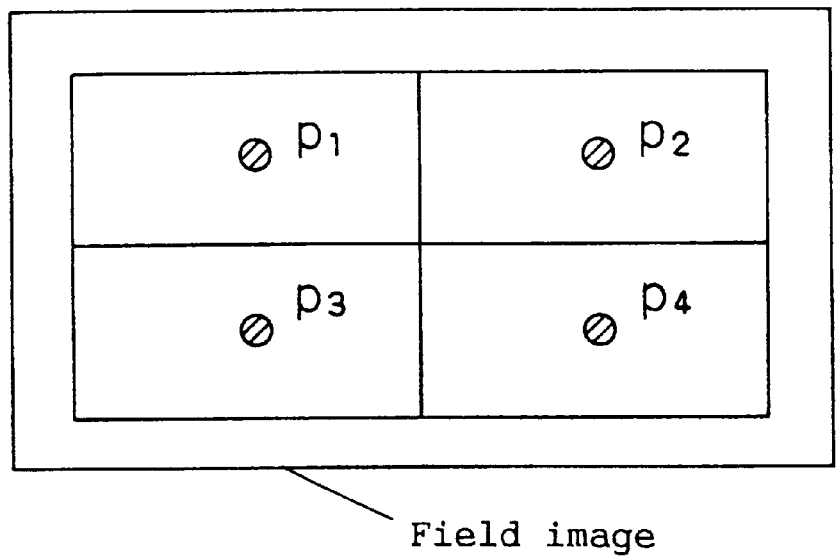
FIG. 2 is a diagram showing a region for calculating local luminance frequency (local histogram)

The gradation conversion table calculating circuit 5 counts the pixel luminance frequency in each one of four representative regions shown in FIG. 2, concerning the pixel of which absolute value of output of the edge extraction circuit 4 is larger than the threshold value.

FIG. 2 is a diagram showing four representative regions set in the field image, in which p1, p2, p3, and p4 show the coordinates of center of gravity of these representative regions.

In FIG. 2, by thus setting the representative regions separately from the peripheral parts of the image, it is intended to prevent that the boundary of the no-picture part is extracted as an edge, and the pixel luminance frequency of the peripheral parts causes strong effects on the gradation conversion effect of the image central part, and that the contrast may be lowered relatively in the image central part.

The gradation conversion table calculating circuit 5 calculates the cumulative luminance frequency normalized according to formula (1), by the pixel luminance frequency counted in each representative region, and writes into the table memory 6 as gradation conversion table.

$$Hi(I) = maxI \cdot \sum_{j=0}^{I} hi(j) \bigg/ \sum_{j=0}^{maxI} hi(j) \quad \text{(Formula 1)}$$

where hi(j) is the luminance in an i-th representative region of quantized luminance j, Hi(I) is the normalized cumulative frequency (gradation conversion table) in the i-th representative region of quantized luminance I, and maxi is the maximum region of quantized luminance (255 in the case of 8-bit quantizing, or 1023 in the case of 10-bit quantizing).

If there is a large deviation in the luminance frequency counted in each representative region, the conversion result may have feeling of strangeness, or the noise may be obvious, and therefore the gradient of the gradation conversion table is controlled by preliminarily setting a limit according to formula (2), and correcting the distribution of luminance frequency.

$$hi(j) = \min(\alpha \cdot meanhi, hi(j)) \quad \text{(Formula 2)}$$

where α is a positive coefficient greater than 1, meanhi is the mean frequency in the i-th representative region, and min( ) means the selection of minimum value, and by setting α, therefore, the gain of luminance extension at the time of conversion is controlled.

Furthermore, by correcting the luminance frequency distribution by formula (3), the gain of the gradation conversion table can be securely defined under the set value α.

$$hi(j) = hi2(j) + \sum_{j=0}^{maxI} \{hi1(j) - hi2(j)\}/maxI \quad \text{(Formula 3)}$$

where hi2(j) is the frequency after correction according to formula (2), and hi1(j) is the frequency before correction.

The correction in formula (3) shows that the frequency clipped by formula (2) is distributed uniformly in all gradations.

By this correction, if the frequency distribution near the edge is extremely deviated to a specific gradation, the gain of the gradation conversion table can be securely limited below a set value.

Writing into the table memory 6 prevents the gradation conversion table from changing quickly in time to cause feeling of strangeness in the result of conversion, if the change of the image in the time direction is quick, by forming a limit about the time change shown in formula (4). It is applied, for example, when the change in the content of image is drastic.

$$Hinew(j) = \beta \cdot Hinow(j) + (1 - \beta)Hiold(j) \quad \text{(Formula 4)}$$

where Hi old ( ) is a gradation conversion table in the i-th representative region written into the table memory 6 previously, Hi now ( ) is a gradation conversion table in the i-th representative region calculated by the gradation conversion table calculating circuit 5 concerning the present field, Hi new ( ) is the gradation conversion table in the i-th representative region updated by the present field and written newly into the table memory 6, and β is a non-negative number fraction less than 1.

By setting β, a limit may be defined in the change of the gradation conversion table in the time direction, which prevents sudden change of the gradation conversion table to cause feeling of strangeness in the result of conversion. The value of β is set somewhere about $\frac{1}{16}$ to $\frac{1}{64}$, and by updating the gradation conversion table in each field, if the gradation frequency changes suddenly at the time of changeover of the scene or the like, the gradation conversion table may be changed smoothly and slowly in 1 or 2 seconds, so that feeling of strangeness may be avoided in the result of conversion.

The conversion value interpolation circuit 7 refers to four gradation conversion tables stored in the table memory 6, and obtains gradation conversion values H1 (I), H2 (I), H3 (I), and H4 (I) of input pixel luminance I from the delay circuit 3.

In consequence, the conversion value interpolation circuit 7 calculates interpolation (or extrapolation), by using the gradation conversion values and coordinates of center of gravity p1 to p4 of the representative regions, depending on the coordinate values in the image of the pixel of the input pixel luminance I, and determines and issues the conversion value for the luminance I.

Figure 3:
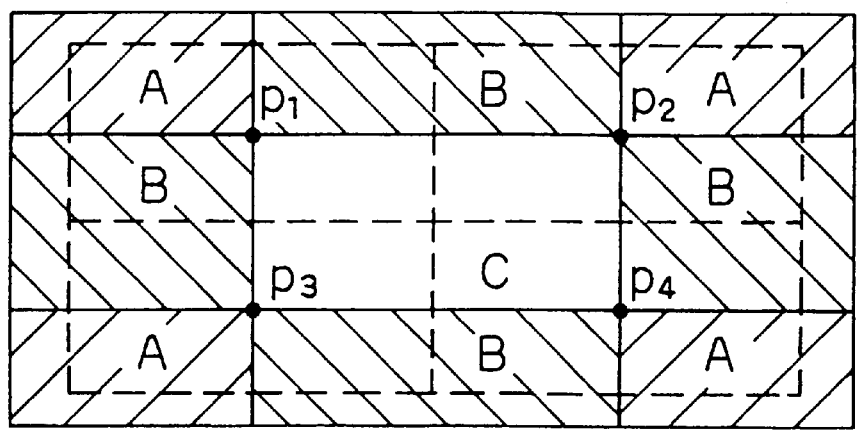
FIGS. 3(a), (b) are diagrams showing interpolation and extrapolation of gradation conversion result.
Figure 3:
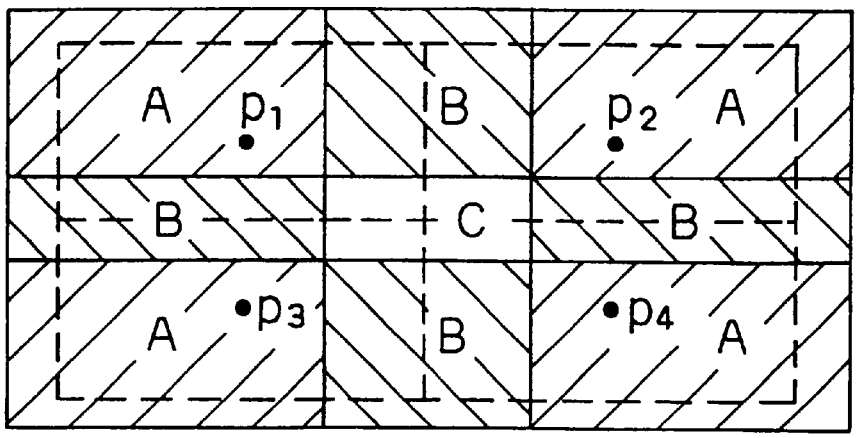

FIG. 3 is a diagram showing an example of an interpolation method of conversion value by the conversion value interpolation circuit 7.

In the diagram, a broken line refers to the representative regions set in the field image, p1 to p4 are centers of gravity of representative regions, being overlapped in one representative region only, and region A of left-downward line shaded area shows its representative region, that is, the region for gradation conversion by the gradation conversion table calculated in the nearest representative region. Region B of right-downward line shaded area overlapped with two representative regions shows the region of gradation conversion by interpolation of the conversion value by the gradation conversion table calculated in these two regions, that is, two representative regions in the vicinity, depending on the coordinate values of the pixels and coordinate values of the center of gravity of the representative regions.

The central region C shows the region of gradation conversion by interpolating the conversion value by the gradation conversion table calculated in the four representative regions, depending on the coordinate values of pixels and coordinate values of the center of gravity of the representative regions.

The boundary of the regions A, B, C may pass through the center of gravity of the representative region as shown in FIG. 3(*a*), or may be as shown in FIG. 3(*b*). In FIG. 3(*a*), meanwhile, the area of the regions A, B, C is wide in this sequence, while in FIG. 3(*c*), it is narrow in the sequence of A, B, C.

The low frequency attenuation circuit 8 attenuates the low frequency components of spatial frequency of input luminance in the horizontal and vertical direction. The characteristic conversion circuit 9 converts the amplitude characteristic of the output of the low frequency attenuation circuit 8, and issues the illusion waveform.

Figure 4:
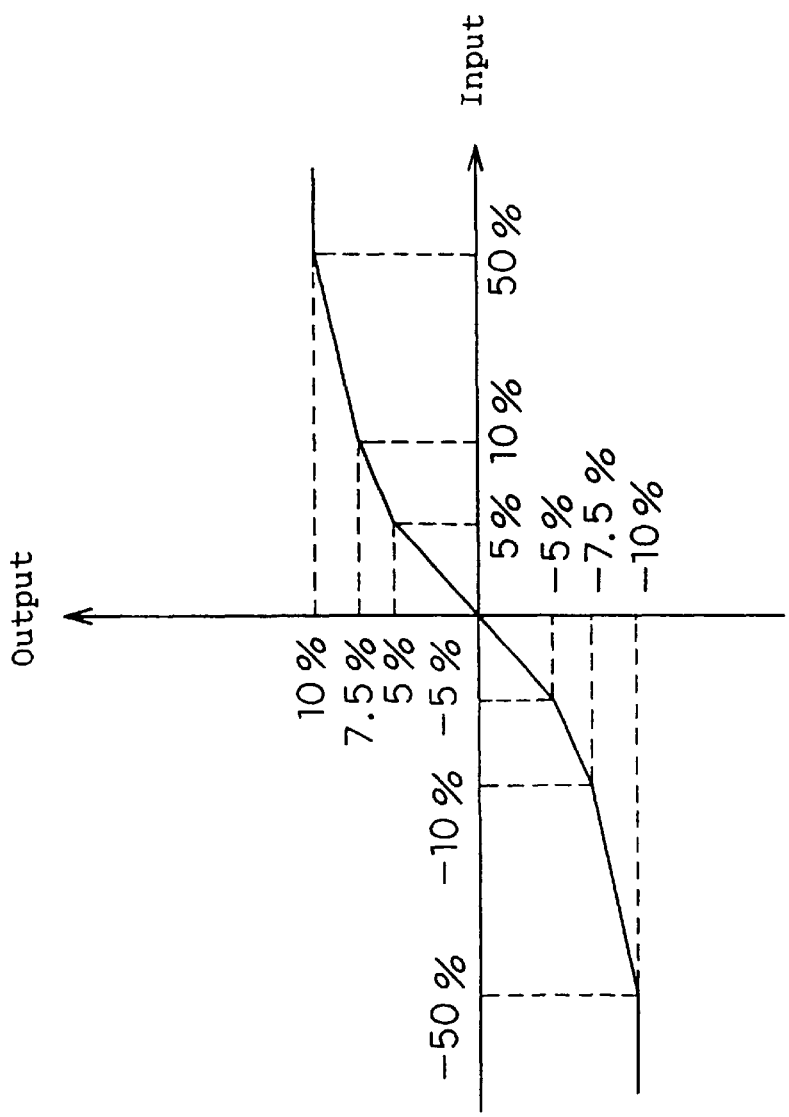
FIG. 4 is a diagram showing an example of input and output characteristic of a characteristic conversion circuit 9.

FIG. 4 shows an example of input and output characteristics of the characteristic conversion circuit 9. The output of the illusion waveform generating circuit 2 is superposed on the output of the gradation conversion circuit 1, and is issued as an output luminance.

Thus, according to the embodiment, the luminance is converted so that the luminance level of the image may be changed notably near the edge, and a waveform for causing an illusion of this luminance level is superposed thereon, so that the contrast of the image displayed on this display device can be improved.

Besides, by designing so as not to count the gradation frequency of the pixel near the edge in the peripheral area of the image, it is effective to avoid feeling of strangeness in the image central part when observing or drop of contrast in the image central part, due to strong effects of the gradation conversion table by frequency of edge neighbor elements in the peripheral part of the image.

Still more, by setting a limit in the change of the gradation conversion table in the time direction, it is possible to reduce the feeling of strangeness when observing due to change of brightness of the object in the image in the time direction.

Concerning the calculation of the gradation conversion table, the gradation conversion table in several representative regions in the image is calculated on the basis of the frequency distribution of pixels near the edge, and as for each pixel, by interpolation or extrapolation of the gradation conversion value in the representative regions, the calculation cost can be decreased. That is, it is not intended to perform interpolation or extrapolation on the gradation conversion table itself.

Figure 5:
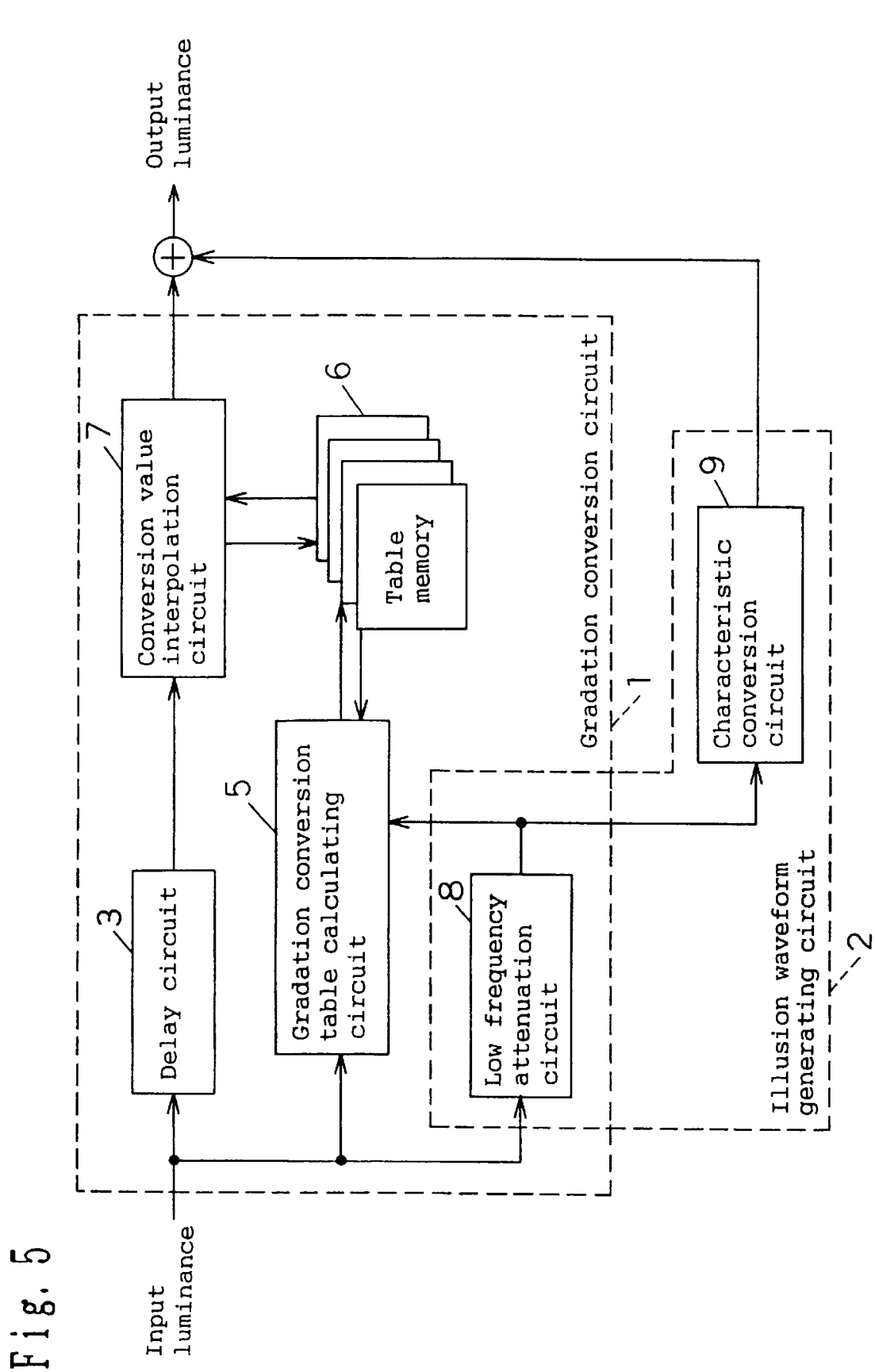
FIG. 5 is a block diagram of an image display apparatus sharing a low frequency attenuation circuit 4 and a low frequency attenuation circuit 8 in FIG. 1.

Incidentally, in this embodiment, by sharing the edge extraction circuit 4 and low frequency attenuation circuit 8 in the same circuit, and composing as shown in FIG. 5, similar effects can be obtained, and the circuit scale can be reduced.

(Embodiment 2)

Figure 9:
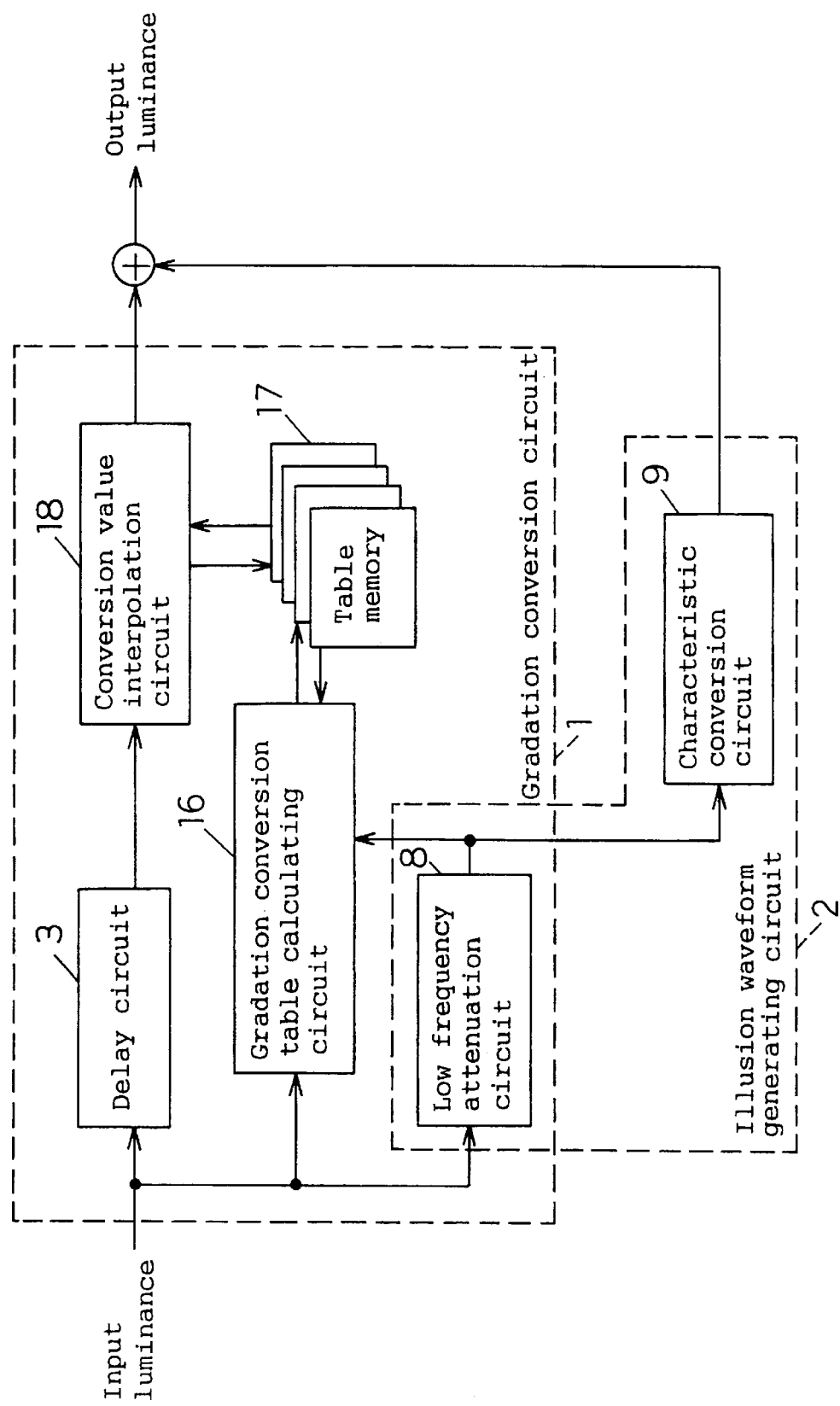
FIG. 9 is a block diagram of an image display apparatus in a second embodiment of the invention.

FIG. 9 shows a constitution of an image display apparatus in a second embodiment of the invention.

In FIG. 9, those operating same as in the image display apparatus in the first embodiment are identified with same reference numerals, and descriptions are omitted, and the operation of gradation conversion table calculating circuit 16, table memory 17, and conversion value interpolation circuit 18 is described below.

The gradation conversion table calculating circuit 16 counts the luminance frequency in four representative regions in FIG. 2, as for the pixels of which absolute value of output of the low frequency attenuation circuit 8 is over the threshold.

Figure 10:
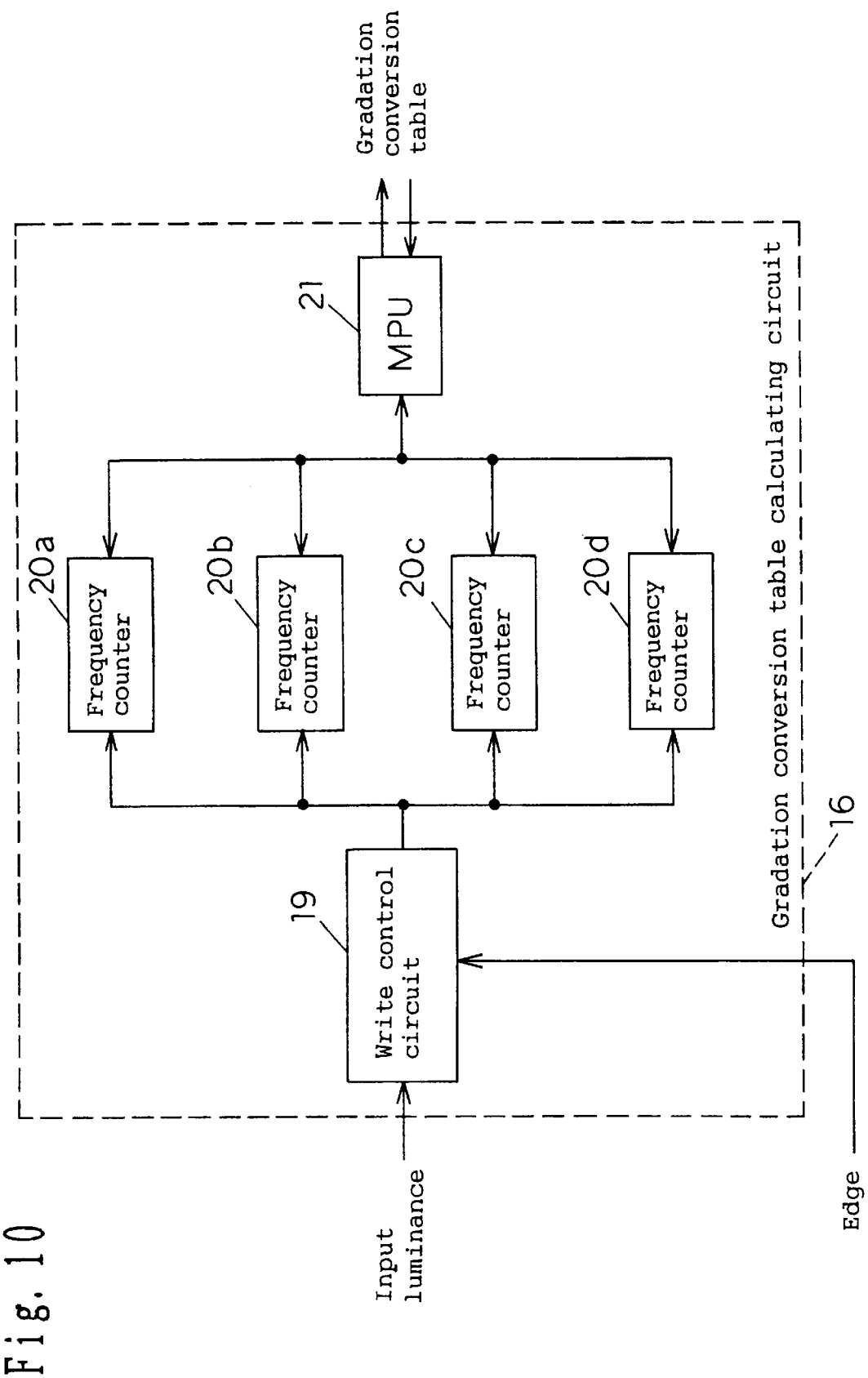
FIG. 10 is a diagram showing an example of constitution of a gradation conversion table calculation circuit.

FIG. 2 is a diagram showing four representative regions set in the field image, and p1, p2, p3, and p4 in the drawing show the coordinates of center of gravity of the representative regions. FIG. 10 is a block diagram showing an example of constitution of the gradation conversion table calculating circuit 16.

In FIG. 10, reference numeral 19 is a write control circuit, 20*a* to 20*d* are frequency counters for counting the gradation frequency of pixels in the representative regions, and 21 is an MPU for calculating the gradation conversion table from the gradation frequency in each representative region, and issuing the obtained gradation conversion table to the table memory. The operation of each component is described below.

The write control circuit 19 increases the frequency value of the frequency counter corresponding to each representative region including the coordinates of the pixel by the corresponding portion, if the absolute value of the. edge component of the image issued by the low frequency attenuation circuit 8 is over the threshold value of the edge component and the coordinate values of the input pixel are within the representative region shown in FIG. 2.

The frequency counters 20*a* to *d* count the gradation frequency in the representative regions.

Counting of gradation frequency is intended to reduce the circuit scale by dividing all gradations (256 gradations in the case of 8 bits, 1023 gradations in 10 bits) in about 16 (that is, the frequency of about upper four bits of luminance is counted).

The MPU 21, concerning the frequency counted by dividing all gradations, calculates the gradation conversion table according to the operations shown in formula 1 to formula 4, writes into the table memory 17 in the vertical blanking period, and clears the frequency value of the frequency counter 20 to 0.

Figure 11:
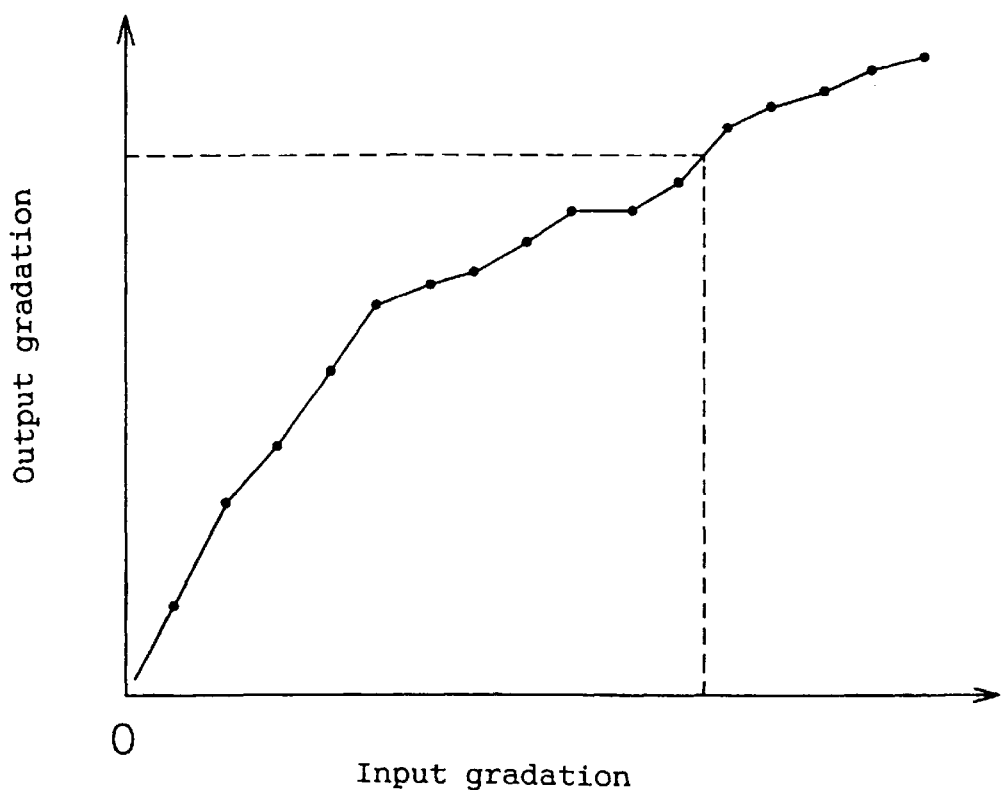
FIG. 11 is a diagram showing gradation conversion by a gradation conversion table approximated by a polygonal curve.

The conversion value interpolation circuit 18 interpolates the value of the gradation conversion table written in the table memory 17 in every representative region, and converts the gradation of the input luminance value. FIG. 11 is a diagram showing a method of interpolating the data of the gradation conversion table and converting the gradation of the input luminance value.

In FIG. 11, black spots relate to the gradation conversion table data calculated on the basis of the frequency counted by dividing all gradations into about 16 sections (axis of abscissas) in one representative region. The conversion value interpolation circuit 18 linearly interpolates the gradation conversion table data calculated discretely in each representative region, and converts the input luminance value.

Depending on the coordinates of the input pixels, the conversion result of luminance value in each representative value is interpolated or extrapolated, and issued as output luminance.

FIG. 3 is a diagram showing an example of an interpolation method of the conversion value in the conversion value interpolation circuit 18.

In the diagram, a broken line shows the representative regions set in the field image, p1 to p4 are centers of gravity of representative regions, and region A in left-downward line shaded area shows the region of performing gradation conversion by the gradation conversion table calculated in the nearest representative region. Region B in right-downward line shaded area shows the region of interpolating the conversion value by the gradation conversion table calculated in two neighbor representative regions and converting the gradation depending on the coordinate values of the pixels and coordinate values of the center of gravity of representative regions.

The central region C shows the region of interpolating the conversion value by the gradation conversion tables calculated in four representative regions, and converting the gradation depending on the coordinate values of the pixels and coordinate values of center of gravity of representative regions.

The boundary of regions A, B, C may pass through the center of gravity of representative regions as shown in FIG. 3(a), or may not pass through the center of gravity of representative regions as shown in FIG. 3(b).

Thus, according to the embodiment, by calculating the gradation conversion table on the basis of the frequency counted by dividing the gradation in each division, the circuit scale of the frequency counter and the capacity of table memory can be reduced (that is, when the gradation frequency of 8 bits is measured, for example, in 16 divisions, as compared with the measurement of all gradation frequency, the number of counters necessary for measuring can be decreased from 256 to 16, and the frequency and quantity of data of the gradation conversion table can be similarly decreased). Moreover, by converting the gradation of the input luminance by interpolating the gradation conversion table, the gradation conversion can be achieved by small circuit scale and calculation cost.

In all embodiments of the invention, in counting of luminance frequency of pixels, also by weighting depending on the coordinate values of the pixels (with a larger weighting coefficient in the image central parts, and a smaller weighting coefficient in the image peripheral parts), the relative contrast drop in the image central parts can be eliminated, and this method is included in the invention.

The edge extraction may be also done by a one-dimensional filter in the horizontal direction, and the circuit can be simplified, and this method is included in the invention.

Calculation of gradation conversion table in the representative regions explained in the first and second embodiments can be done sequentially in each representative region in one field period, and at the same time, by increasing the coefficient $\beta$ in formula (4) for controlling the time change of the gradation conversion table depending on the number of representative regions (for example, four times in the case of first and second embodiments), the calculation cost is decreased, and similar effects can be obtained, and this method is included in the invention.

Figure 6:
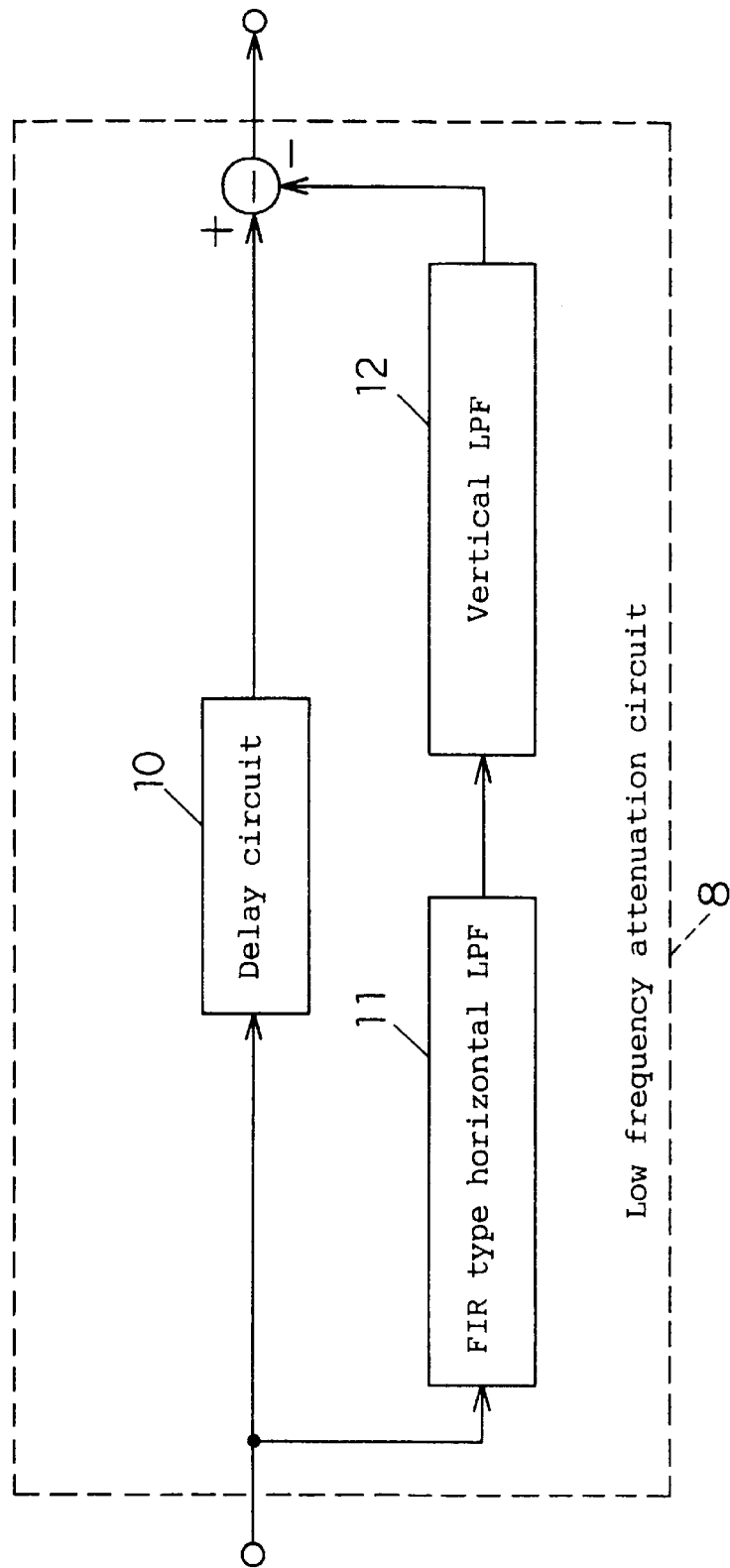
FIG. 6 is a diagram showing an example of constitution of the low frequency attenuation circuit 8.

In all embodiments of the invention, by using the LPF including the FIR type LPF in the horizontal direction and IIR type circuit in the vertical direction in the low frequency attenuation circuit 8 as shown in FIG. 6, a circuit having a symmetrical phase characteristic in the horizontal direction and an asymmetrical phase characteristic in the vertical direction, and small in circuit scale can be realized, and this method is included in the invention.

FIG. 6 shows an example of constitution of the low frequency attenuation circuit 8, and in FIG. 6 reference numeral 10 is a delay circuit for delaying the input signal depending on the delay time by the horizontal and vertical LPF, 11 is an FIR type horizontal LPF, and 12 is a vertical LPF including an IIR type circuit.

The output of the vertical LPF 12 which is a low frequency component in the horizontal and vertical direction is attenuated from the delayed input signal, and the low frequency attenuated component of input signal is issued. The location of the FIR type LPF 11 and vertical LPF 12 shown in FIG. 6 may be changed back and forth.

In all embodiments of the invention, the low frequency attenuation circuit 8 shares the majority of the delay circuit 10 with the vertical LPF 12 by using the output of the vertical LPF 12 including the IIR type circuit as the input to the FIR type horizontal LPF 11, and the circuit scale can be reduced, which is included in the invention.

Figure 7:
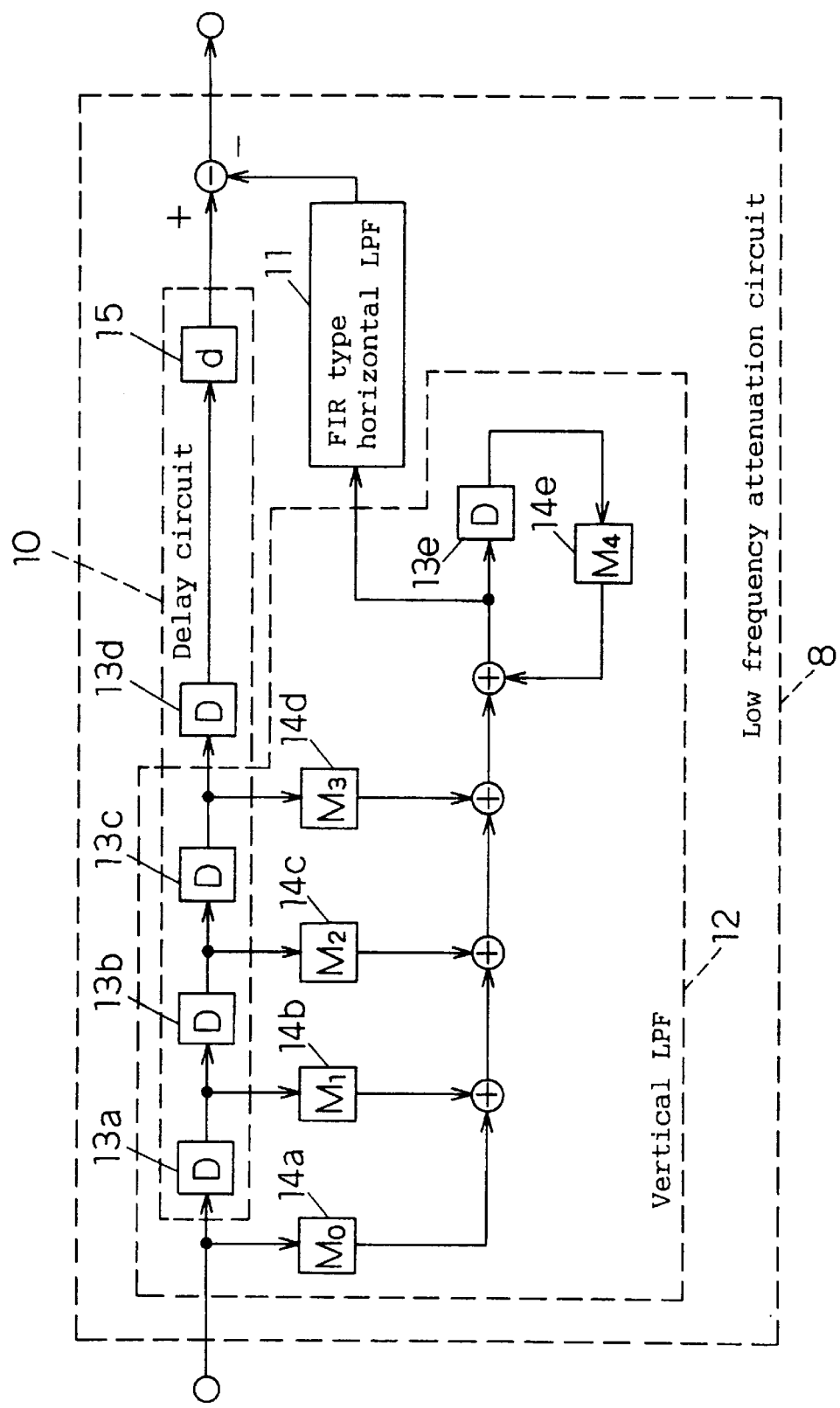
FIG. 7 is a diagram showing an example of constitution of low a frequency attenuation circuit reduced in circuit scale.

In FIG. 7, reference numeral 13 is a delay circuit for delaying and issuing the data by the portion of one line, 14 is a multiplication circuit for multiplying the data by constant times, and 15 is a delay circuit for delaying and issuing the data by the portion of the delay (several pixels worth) by the FIR type horizontal LPF 11. The multiplier M4 is a fraction less than 1 (the condition for avoid divergence of output), and the sum of multipliers M0 to M3 is set so as to be 1−M4 (condition for gain of 1 after lapse of time).

Figure 8:
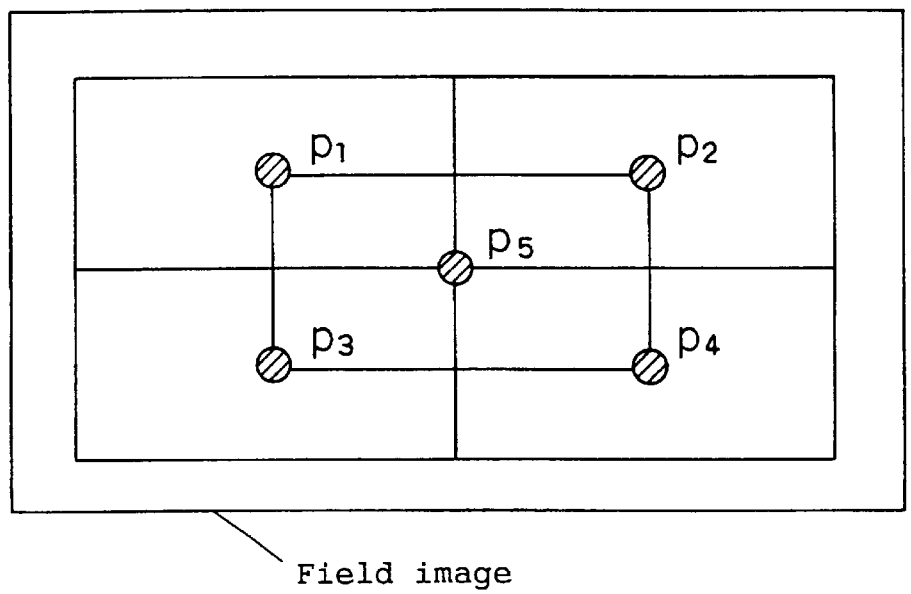
FIG. 8 is a diagram showing a region for calculating local luminance frequency (local histogram)

In the first and second embodiments of the invention, four representative regions are set, but as shown in FIG. 8, a representative region may be also set in the middle of the image, and occurrence of feeling of strangeness in the image central part or lowering of contrast may be decreased, and this method is included in the invention.

In all embodiments of the invention, the contrast may be improved depending on the characteristic of the display device by performing γ-correction on the output luminance (the luminance after superposition of illusion waveform) depending on the characteristic of the display device, performing γ-correction on the output of the gradation conversion circuit, performing correction on the gradation conversion table depending on the characteristic of the display device, counting the frequency weighted depending on the gradation, varying the section length depending on the gradation when counting the frequency by dividing all gradation into sections, or by performing γ-correction preliminarily on the luminance of the input pixel, and this method is included in the invention.

Figure 12:
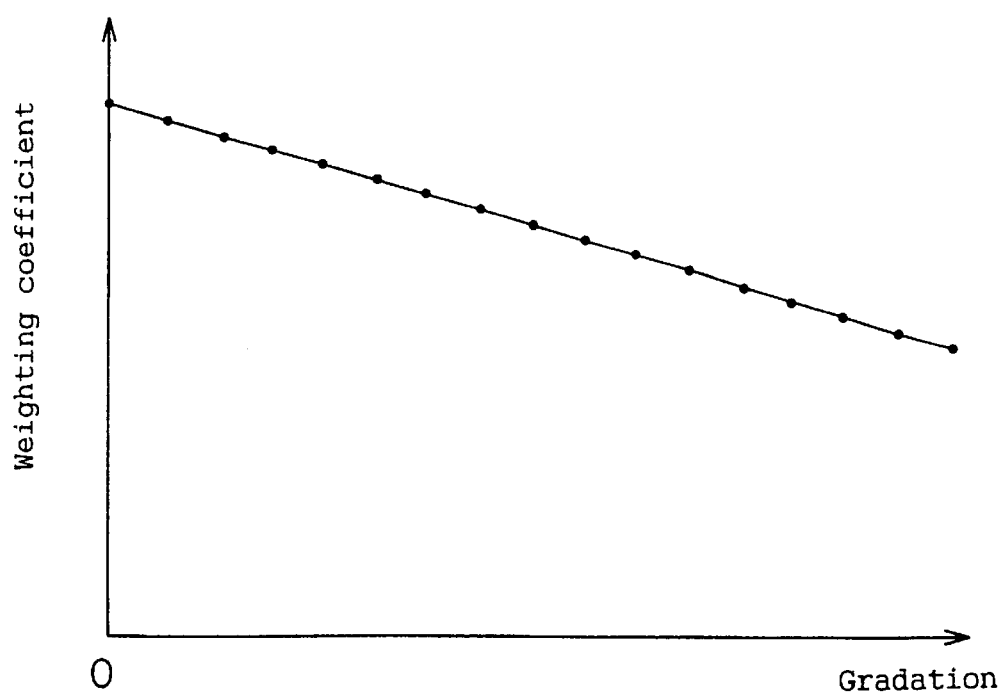
FIG. 12 is a diagram showing distribution of weighting coefficient for correcting the gradation conversion value.
Figure 13:
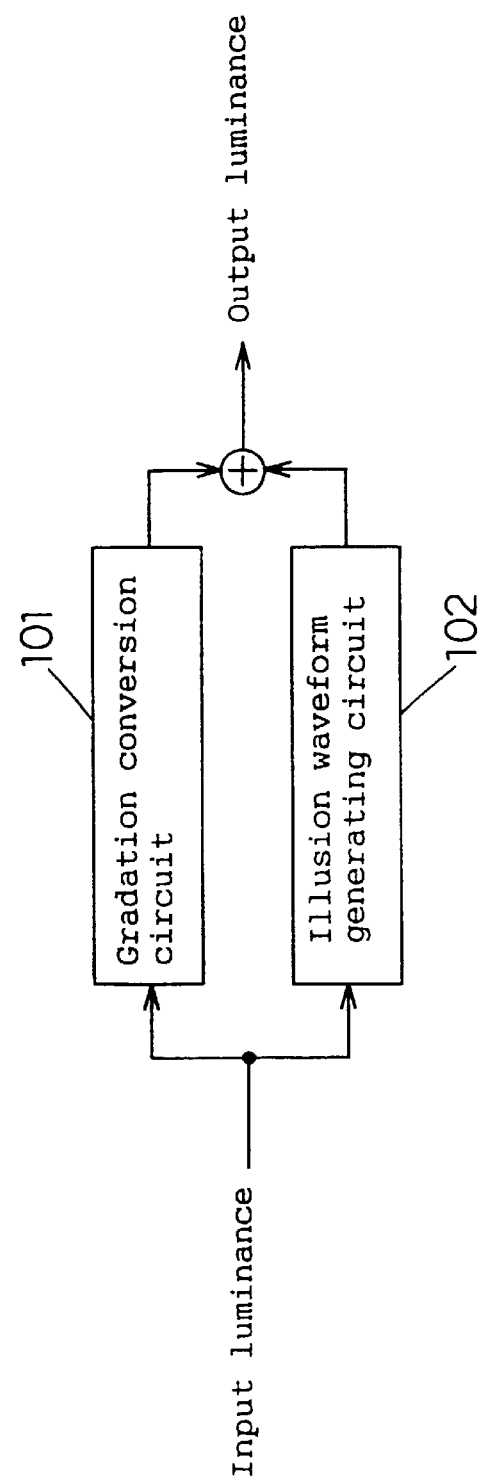
FIG. 13 is a block diagram of a conventional image display apparatus.
Figure 14:
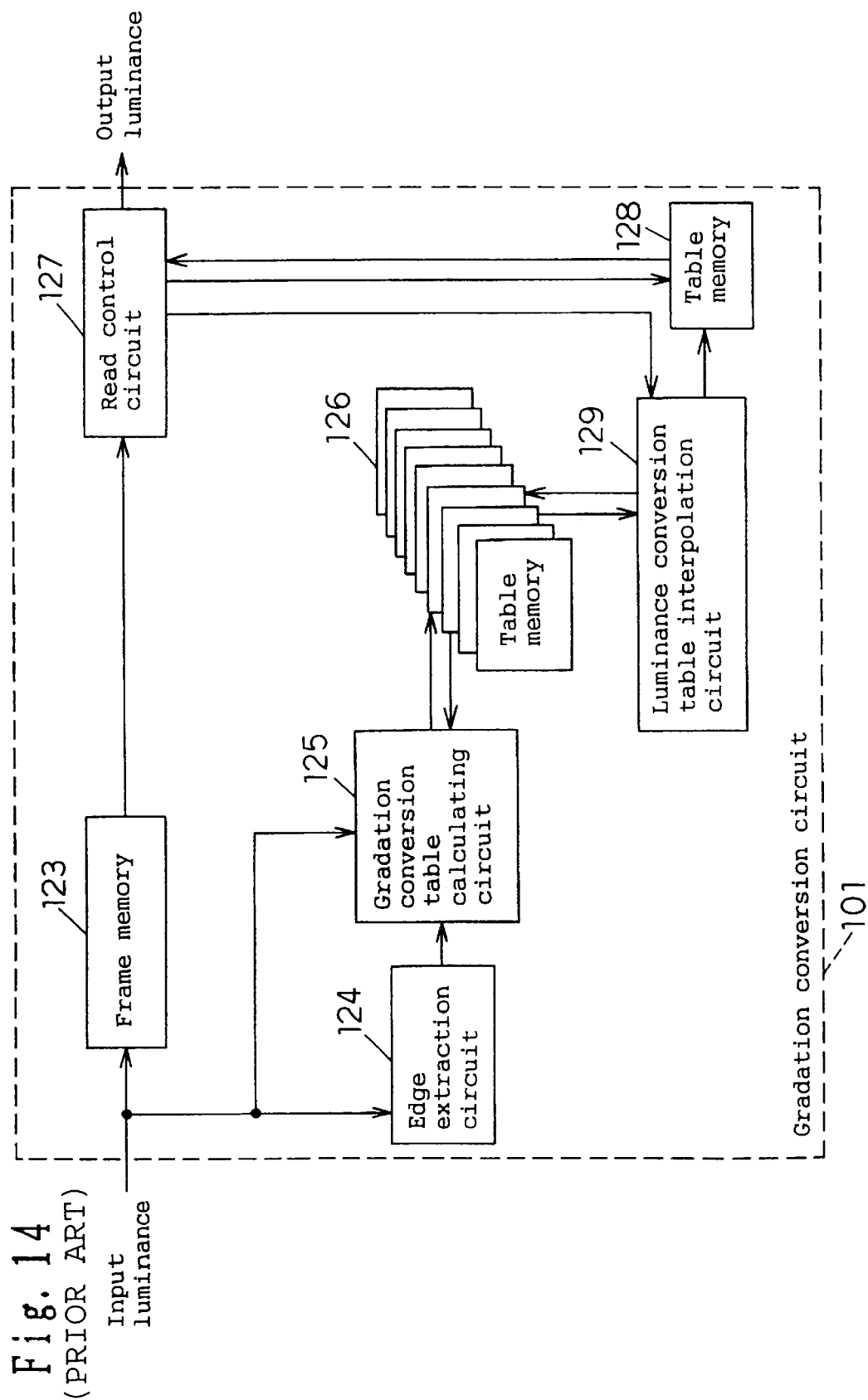
FIG. 14 is a block diagram of a gradation conversion circuit in the conventional image display apparatus.
Figure 15:
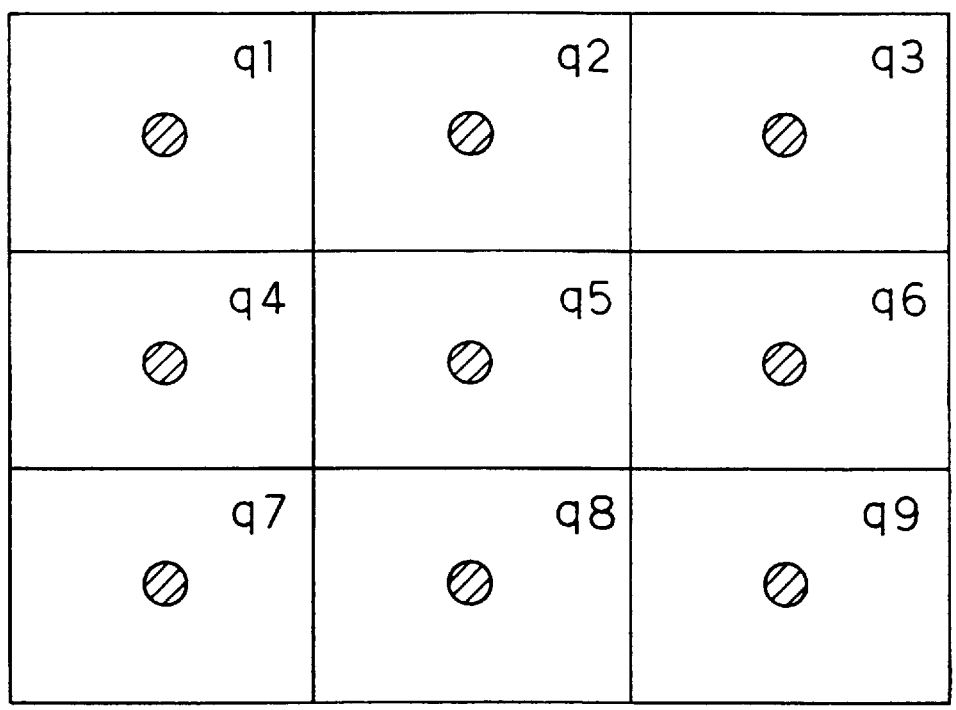
FIG. 15 is a diagram showing a region of calculation of local luminance frequency (local histogram) in the prior art.
Figure 16:
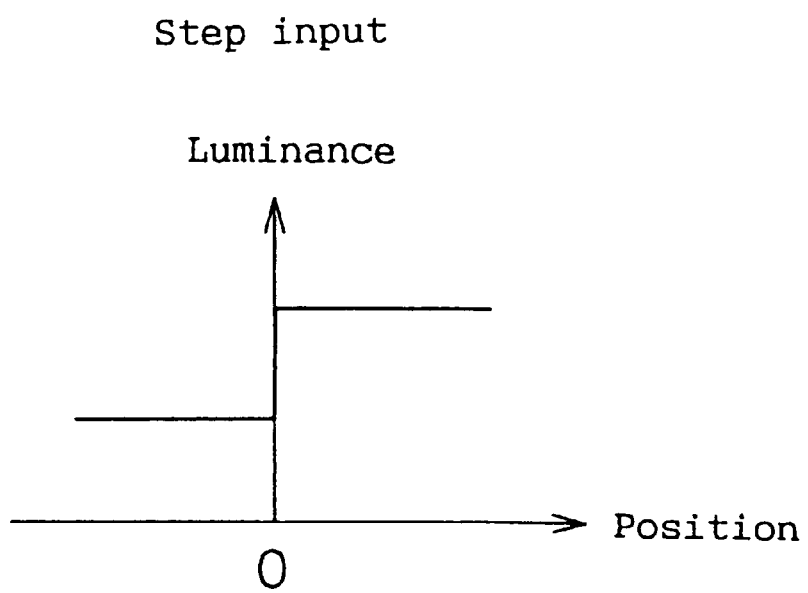
FIG. 16 is a diagram showing a step input.
Figure 17:
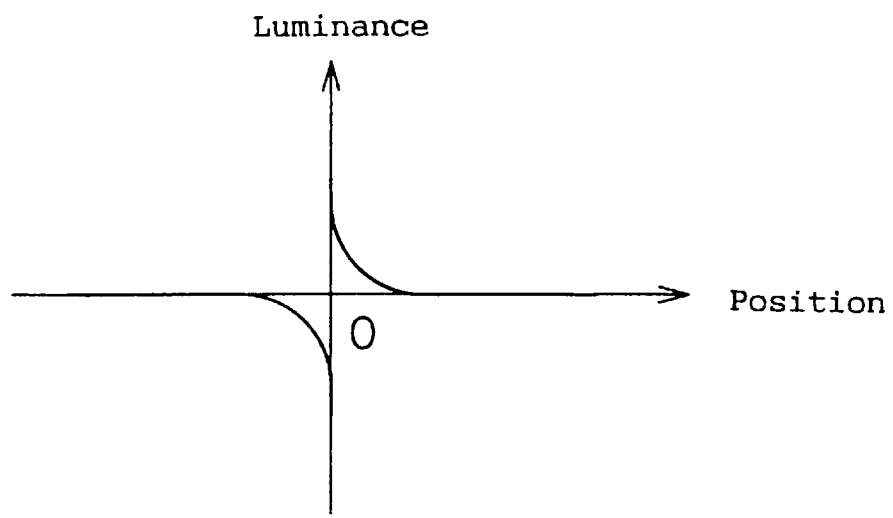
FIG. 17 is a diagram showing a step response of low frequency attenuation circuit.
Figure 18:
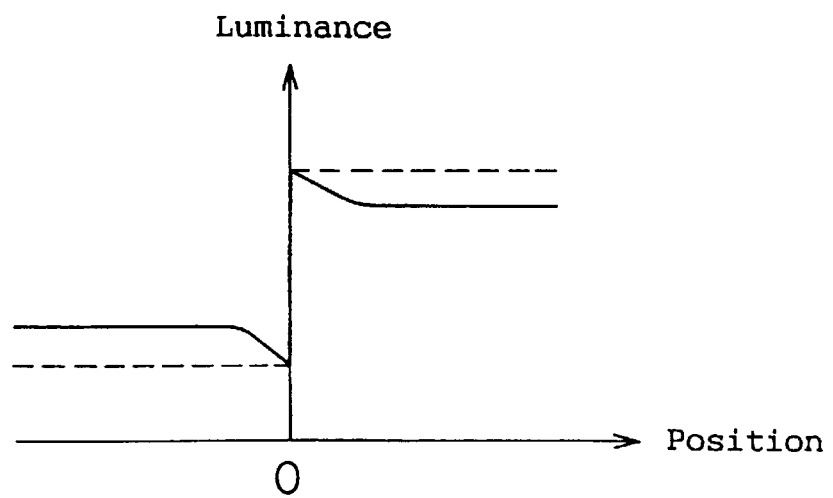
FIG. 18 is a diagram showing result of contrast improvement.
Figure 19:
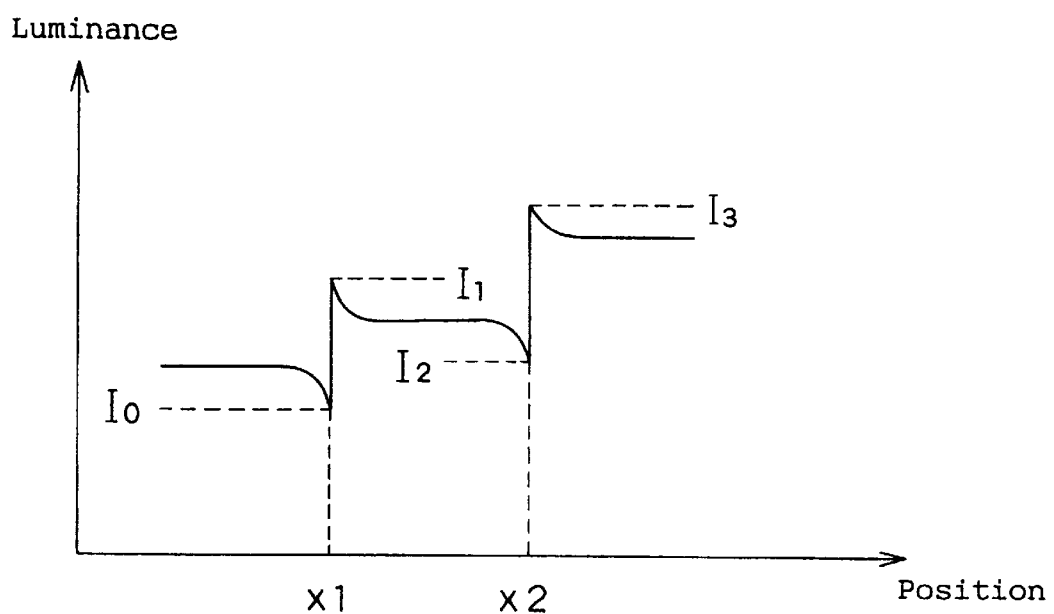
FIG. 19 is a diagram showing result of contrast improvement.

Counting of frequency weighted depending on the gradation can be done easily without increasing the circuit scale, by calculating the gradation conversion table after multiplying the weighting coefficient shown in FIG. 12 by the frequency in each section at the time of calculation of gradation conversion table by the MPU 21 in FIG. 10.

Multiplication by the weighting coefficient shown in FIG. 12 means to perform gradation conversion shown in formula (5) preliminarily. That is, γ-correction before gradation correction is done by conversion by approximating by a quadratic expression.

$$Iout = (a \cdot Iin^2)/2 + b \cdot Iin \quad \text{(Formula 5)}$$

where a·Iin+b (see FIG. 12) shows the weighting coefficient about gradation I.

Incidentally, the distribution of weighting coefficient may not be limited to a linear change as shown in FIG. 12,. but it may distribute in a curved change.

Correction of the gradation conversion table depending on the characteristic of the display device may be also done easily without increasing the circuit scale, similarly, by multiplying the value of the gradation conversion table by γ-correction value in the MPU 21.

Multiplication of the value of the gradation conversion table by γ-correction value is equivalent to γ-correction of the value after gradation conversion.

Thus, according to the invention, by converting the luminance value so that the luminance level of the image may change largely near the edge, and superposing thereon a waveform for causing an illusion of this luminance level, the contrast of the image displayed on the display device can be improved.

Besides, without counting the gradation frequency of pixels near the edge, in the peripheral parts of the image, it is effective to prevent from causing a feeling of strangeness in the image middle part at the time of observation or lowering of contrast in the image central part due to strong effects of frequency of pixels near the edge in the image peripheral parts on the gradation conversion table.

By limiting the change of the gradation conversion table in the time direction, it is effective to decrease the feeling of strangeness at the time of observation due to change of brightness of the same object in the time direction in the image.

At the time of calculation of the gradation conversion table, by calculating the gradation conversion table on the basis of the frequency distribution of pixels near the edge, and interpolating or extrapolating the gradation conversion value in the representative regions as for each pixel, the calculation cost can be decreased.

Also at the time of calculation of gradation conversion table, by calculating on the basis of the frequency counted by dividing the gradation in each section, and interpolating the gradation conversion table to convert the input luminance value in gradation, it is effective to reduce the circuit scale of the frequency counter and capacity of table memory.

The circuit scale can be also reduced by sharing the low frequency attenuation circuit and edge extraction circuit, or the delay circuit and part of circuit of IIR type vertical LPF.

The contrast can be improved depending on the characteristic of the display device by performing γ-correction on the luminance after superposition of the illusion waveform depending on the characteristics of the display device, performing γ-correction on the output of the gradation conversion circuit, correcting the gradation conversion table depending on the characteristic of the display device, counting the frequency weighted depending on the gradation, changing the section length depending on the gradation when counting the frequency by dividing all gradation into sections, or performing γ-correction preliminarily on the input luminance value, and this effect is outstanding.

What is claimed is:

1. An image display method for improving contrast in television images by displaying a television image by different gradation conversion in every pixel comprising the steps of:

extracting an edge of luminance of the image to obtain an edge of the image, carrying out gradation conversion on the basis of gradation luminance frequency distribution of pixels near the edge of the image, counting gradation luminance frequency of the pixels near the edge of the image, and while counting gradation luminance frequency of pixels near the image edge, weighting said counting of gradation luminance frequency depending on the coordinate values of each pixel so as to a eliminate relative contrast drop in a central part of the image with respect to peripheral parts of the image.

2. An image display method for improving contrast in television images by displaying a television image by different gradation conversion in every pixel comprising the steps of:

extracting an edge of luminance of the image to obtain an edge of the image, carrying out gradation conversion on the basis of gradation luminance frequency distribution of pixels near the edge of the image, counting gradation luminance frequency of the pixels near the edge of the image, and weighting said counting of gradation luminance frequency depending on the gradation so as to perform both a γ-correction process and the gradation conversion, said γ-correction process depending on characteristics of a television display device.

3. An image display method for improving contrast in television images by displaying a television image by different gradation conversion in every pixel comprising the steps of:

extracting an edge of luminance of the image to obtain an edge of the image, obtaining a gradation conversion table on the basis of luminance gradation frequency distribution of pixels near the edge of the image, counting luminance gradation frequency of pixels near the edge of the image, and restricting said counting to pixels other than pixels in the periphery of the image to thereby avoid strangeness in a central part of the image at the time of observation which strangeness is due to affects of luminance frequency of pixels near the edge of peripheral parts of the image.

4. An image display method for improving contrast in television images by displaying a television image sequence by different gradation conversion in every pixel comprising the steps of:

extracting an edge of luminance of each image to obtain an edge of the image, obtaining an obtained gradation conversion table for a representative region in the image on the basis of luminance gradation frequency distribution of pixels near an edge of the image for each image, and, performing weighted-addition of elements in the obtained gradation conversion table with corresponding elements in a previous gradation conversion table for the same representative region to obtain a change limited gradation conversion table having elements that are limited in how they change in time, wherein strangeness during observation-due to brightness changes in an object in each image in time is decreased.

5. An image display method for as claimed in claim 3, wherein said step of obtaining the gradation conversion table includes the steps of obtaining plural gradation conversion tables by obtaining a gradation conversion table for each of a specific number of representative regions in the image on the basis of the luminance distribution of pixels near the edge, and executing gradation conversion by interpolating or extrapolating a conversion result given by each gradation conversion table in each representative region for each pixel.

6. An image display method of claim 1, wherein said step of extracting an edge is performed by using a one-dimensional filter.

7. An image display method of claim 2, wherein said step of extracting an edge is performed by using a one-dimensional filter.

8. An image display method of claim 3, wherein said step of extracting an edge is performed by using a one-dimensional filter.

9. An image display method of claim 4, wherein said step of extracting an edge is performed by using a one-dimensional filter.

10. An image display method of claim 5, wherein said step of extracting an edge is performed by using a one-dimensional filter.

11. An image display method of claim 5, wherein the step of calculating of each gradation conversion table in the representative regions is performed in one representative region in one field period, and a gradation conversion table for all representative regions is updated in a specified number of field periods of the representative regions.

12. An image display method of claim 5, wherein a gradation conversion table is calculated for each of four representative regions.

13. An image display method of claim 11, wherein a gradation conversion table is calculated for each of four representative regions.

14. An image display method of claim 5, wherein a gradation conversion table is calculated for each of five representative regions, and a relative contrast drop in a central part of the image with respect to peripheral parts of the image is suppressed, and calculation cost is reduced.

15. An image display method of claim 11, wherein the gradation conversion table is calculated in five representative regions, and a relative contrast drop in a central part of the image with respect to peripheral parts of the image is suppressed, and calculation cost is reduced.

16. An image display method of claim 1, wherein the step of carrying out gradation conversion includes a step of obtaining a gradation conversion table approximated by plural straight lines, thereby reducing operation quantity and circuit scale.

17. An image display method of claim 2, wherein the step of carrying out gradation conversion includes a step of obtaining a gradation conversion table approximated by plural straight lines, thereby reducing operation quantity and circuit scale.

18. An image display method of claim 3, wherein the gradation conversion table is approximated by plural straight lines, thereby reducing operation quantity and circuit scale.

19. An image display method of claim 4, wherein each gradation conversion table is approximated by plural straight lines, thereby reducing operation quantity and circuit scale.

20. An image display method of claim 5, wherein at least one gradation conversion table is approximated by plural straight lines, thereby reducing operation quantity and circuit scale.

21. An image display method of claim 16, wherein a section length approximated by each straight line is varied depending on the gradation to perform gradation correction and a γ-correction process at the same time, and thereby gradation conversion depends on characteristics of the display device.

22. An image display method of claim 17, wherein a section length approximated by each straight line is varied depending on the gradation to perform gradation correction and a γ-correction process at the same time, and thereby gradation conversion depends on characteristics of the display device.

23. An image display method of claim 18, wherein a section length approximated by each straight line is varied depending on the gradation to perform gradation correction and a γ-correction process at the same time, and thereby gradation conversion depends on characteristics of the display device.

24. An image display method of claim 19, wherein a section length approximated by each straight line is varied depending on the gradation to perform gradation correction and a γ-correction process at the same time, and thereby gradation conversion depends on characteristics of the display device.

25. An image display method of claim 20, wherein a section length approximated by each straight line is varied depending on the gradation to perform gradation correction and a γ-correction process at the same time, and thereby gradation conversion depends on characteristics of the display device.

26. An image display method comprising the steps of:

generating an illusion image for causing an illusion in an input image from the input image by using a FIR filter in a horizontal direction and an IIR filter in a vertical direction, converting gradation of the input image to obtain a gradation converted image, and superimposing the illusion image on the gradation converted image to obtain an image having improved contrast at reduced calculation cost.

27. A gradation conversion circuit for improving contrast in television images, said circuit comprising:

an edge extraction circuit for receiving an image signal representing an input image and extracting an extracted edge of the input image therefrom, a gradation conversion table calculating circuit for obtaining a plurality gradation conversion tables on the basis of gradation frequency distributions of pixels near the extracted edge, a memory for storing obtained gradation conversion tables, and a conversion circuit for performing different gradation conversion of the image signal for every pixel based upon gradation conversion tables stored in the memory, wherein the gradation conversion table calculating circuit obtains the gradation conversion tables for a plurality of representative window regions which are remote from peripheral parts of the image and, restricts counting to pixels other than pixels in the peripheral parts of the image so as to avoid strangeness in a central part of the image due to affects of gradation frequency of pixels near the edge in peripheral parts of the image.

28. An image signal conversion apparatus comprising:

a gradation conversion circuit of claim 27, an illusion waveform generating circuit, also receiving the image signal, for generating an illusion image causing an illusion in the input image, and a superimposing circuit for superimposing an illusion image generated by the illusion waveform generating circuit on output from the gradation conversion circuit.

* * * * *